No. 678,905. Patented July 23, 1901.
E. W. RICE, Jr.
CONTROLLING HIGH POTENTIAL CIRCUITS.
(Application filed May 24, 1900.)
(No Model.)
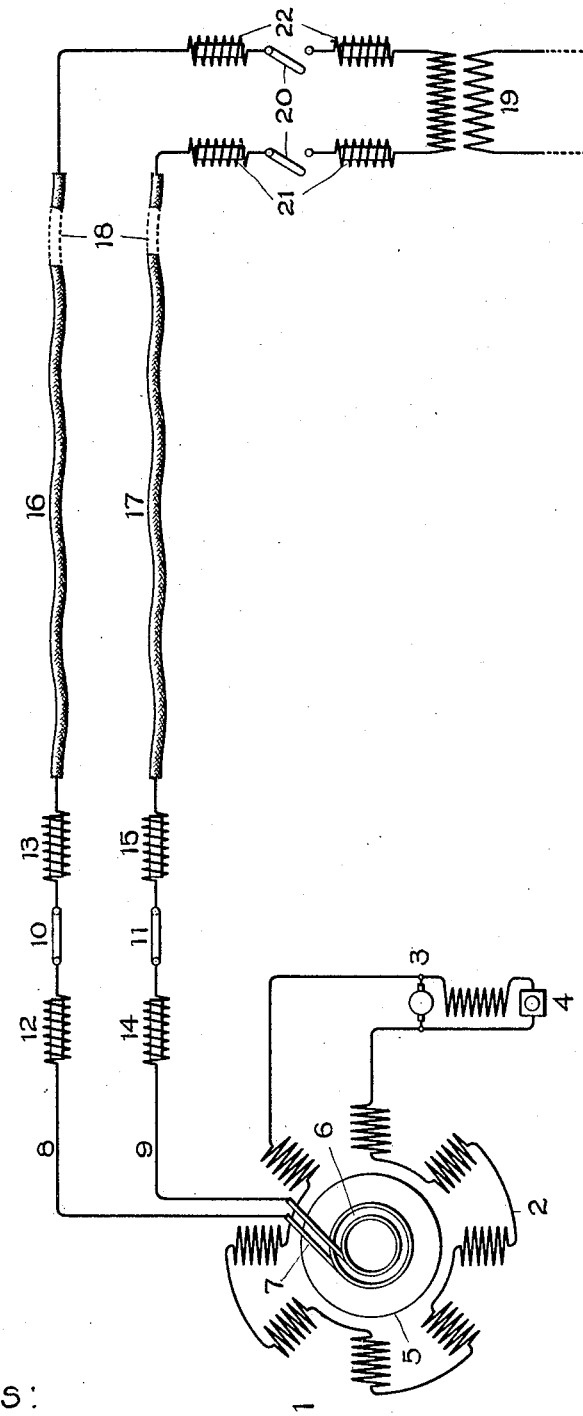
Witnesses:
Lewis P. Abell.
Alexander D. Lunt.
Inventor:
Edwin W. Rice Jr.,
by Albert G. Davis
Atty.

UNITED STATES PATENT OFFICE.

EDWIN W. RICE, JR., OF SCHENECTADY, NEW YORK, ASSIGNOR TO THE GENERAL ELECTRIC COMPANY, OF NEW YORK.

CONTROLLING HIGH-POTENTIAL CIRCUITS.

SPECIFICATION forming part of Letters Patent No. 678,905, dated July 23, 1901.

Application filed May 24, 1900. Serial No. 17,782. (No model.)

*To all whom it may concern:*

Be it known that I, EDWIN W. RICE, Jr., a citizen of the United States, residing at Schenectady, county of Schenectady, State of New York, have invented certain new and useful Improvements in Controlling High-Potential Circuits, (Case No. 1,266,) of which the following is a specification.

My present invention relates to the control of alternating-current circuits, and more particularly to those which are of high potential and which possess a certain amount of capacity and self-induction. Lines feeding underground cables are good examples of this latter class of circuits. In such circuits it is a hazardous matter to cause any sudden or abrupt change in the current flowing, as by opening and closing the circuit through an ordinary switch, circuit-breaker, or the like. Any such sudden make or break in the circuit usually gives rise to a high resonant rise of potential, which is generally of an oscillating nature, causing violent surges of current back and forth in the line. High electromotive forces or potentials thus produced seriously endanger the insulation of the line and cause frequent breakdowns, especially in underground cables where such are employed. I have found that if inductances be connected in circuit with such a line and the circuit either made or broken between such inductances, the high potentials which are thus produced are limited in their range of action to the inductance-coils themselves, thus preserving other and more valuable apparatus from danger of injury.

The drawing constitutes a diagrammatic illustration of an application of my invention, the novel features of which are particularly pointed out in the claims appended hereto.

At 1 is indicated any suitable source of high-potential alternating current, in this case shown as a generator. The field-circuit 2 is excited by direct current derived from any suitable source of direct current—as, for example, an exciter 3. This exciter is of any usual type and is provided with a field-rheostat 4 for varying its electromotive force, and thereby regulating the electromotive force of the generator. The armature of the generator 1 is indicated at 5, and this winding, here shown as single-phase merely by way of illustration, is connected through collector-rings 6 and brushes 7 to transmission-lines 8 and 9. The main switches at the transmitting end of this line-circuit are shown at 10 and 11, each of these switches being arranged in circuit between two inductance-coils, the switch 10 being in circuit between inductance-coils 12 and 13 and switch 11 between inductance-coils 14 and 15. External to the transmitting end of the lines are two underground cables, (indicated at 16 17,) these cables being of indefinite extent, as indicated by the dotted lines 18, and terminating within any selected distance of the receiving end of the line, (indicated in this instance by a step-down transformer 19.) Like the transmitting end of the line, the receiving end is provided with circuit opening and closing switches 20, each arranged between a pair of inductance-coils, one pair being shown at 21 and the other at 22. By thus arranging the circuit-controlling switches each in position between two inductance-coils the rises of potential which take place upon making and breaking a circuit, together with resultant oscillations of current, are limited in their activity to the regions of the inductance-coils, which serve to damp out and suppress transmission of the high electromotive forces to other portions of the line, whereby if any damage takes place due to breaking down of insulation it will occur in the neighborhood of the inductance-coils, and therefore in places where it is easily detected and remedied. The great inconvenience and expense which would follow the breakdown of insulation in the underground cables or in expensive generating and receiving apparatus are thereby avoided.

What I claim as new, and desire to secure by Letters Patent of the United States, is—

1. The method of breaking an alternating-current circuit which consists in confining the break between inductance-coils and suppressing thereby the transmission of high-resonance potentials along said circuit.

2. The method of protecting an electric circuit from dangerously-high electromotive forces due to making or breaking the circuit which consists in causing the make or break to occur at a point or points in the line between inductance devices.

3. The method of making or breaking an electric circuit which consists in confining the electromotive forces due to making or breaking the circuit, to the vicinity of the point of make or break, whereby the transmission of high-resonance potentials along said circuit is prevented.

In witness whereof I have hereunto set my hand this 22d day of May, 1900.

EDWIN W. RICE, Jr.

Witnesses:
BENJAMIN B. HULL,
MASEL H. EMERSON.